(12) United States Patent
Smith et al.

(10) Patent No.: US 12,449,884 B1
(45) Date of Patent: Oct. 21, 2025

(54) USER-CONFIGURABLE ADAPTIVE VOLTAGE SCALING (AVS)

(71) Applicant: Marvell Asia Pte Ltd, Singapore (SG)

(72) Inventors: Scott A Smith, Taylor, TX (US); Christian Lutkemeyer, Irvine, CA (US)

(73) Assignee: Marvell Asia Pte Ltd, Singapore (SG)

( * ) Notice: Subject to any disclaimer, the term of this patent is extended or adjusted under 35 U.S.C. 154(b) by 71 days.

(21) Appl. No.: 18/488,083

(22) Filed: Oct. 17, 2023

Related U.S. Application Data

(60) Provisional application No. 63/417,176, filed on Oct. 18, 2022.

(51) Int. Cl.
| | |
|---|---|
| G06F 1/26 | (2006.01) |
| G06F 1/32 | (2019.01) |
| G06F 1/3228 | (2019.01) |
| G06F 1/3234 | (2019.01) |
| G06F 1/3296 | (2019.01) |

(52) U.S. Cl.
CPC .......... *G06F 1/3228* (2013.01); *G06F 1/3243* (2013.01); *G06F 1/3296* (2013.01)

(58) Field of Classification Search
CPC .................................................... G06F 1/3228
See application file for complete search history.

(56) References Cited

U.S. PATENT DOCUMENTS

| | | | |
|---|---|---|---|
| 8,370,654 B1 * | 2/2013 | Hasko | G06F 1/26 323/224 |
| 8,519,781 B1 | 8/2013 | Zhu et al. | |
| 9,223,327 B1 | 12/2015 | Zhu et al. | |
| 2009/0228846 A1 * | 9/2009 | McConaghy | G06F 30/36 716/132 |
| 2014/0357073 A1 * | 12/2014 | Mo | H10D 64/017 438/595 |
| 2016/0275289 A1 * | 9/2016 | Sethumadhavan | H04L 63/0428 |
| 2022/0327491 A1 * | 10/2022 | Smart | G06Q 10/1053 |
| 2023/0130744 A1 * | 4/2023 | Reeves | D06F 58/38 34/524 |

FOREIGN PATENT DOCUMENTS

WO     2015097657 A2     7/2015

OTHER PUBLICATIONS

Wikipedia, "ISO-26262," pp. 1-7, last edited Jun. 19, 2022.

* cited by examiner

*Primary Examiner* — Mohammed H Rehman
(74) *Attorney, Agent, or Firm* — Meitar Patents Ltd.; Daniel Kligler

(57) ABSTRACT

An Integrated Circuit (IC) includes electronic circuitry, multiple sensors, and an Adaptive Voltage Scaling (AVS) circuit. The electronic circuitry is configured to be powered by one or more supply voltages. The multiple sensors are configured to measure values affected by the one or more supply voltages, and to produce multiple sensor outputs. The AVS circuit is configured to adaptively set the one or more supply voltages by applying to the sensor outputs an AVS model having one or more user-defined parameters, to generate performance data based on the sensor outputs, to export the performance data from the IC, to receive the one or more user-defined parameters into the IC in response to the performance data, and to configure the AVS model to operate in accordance with the received user-defined parameters.

20 Claims, 3 Drawing Sheets

USER-CONFIGURABLE ADAPTIVE VOLTAGE SCALING (AVS)

CROSS-REFERENCE TO RELATED APPLICATIONS

This application claims the benefit of U.S. Provisional Patent Application 63/417,176, filed Oct. 18, 2022, whose disclosure is incorporated herein by reference.

FIELD OF THE DISCLOSURE

The present disclosure relates generally to electronic Integrated Circuits (ICs), and particularly to methods and systems for Automatic Voltage Scaling (AVS) in ICs.

BACKGROUND

Adaptive Voltage scaling (AVS) techniques are commonly used for matching the supply voltage of an IC to individual IC characteristics, and for meeting momentary demands for power, e.g., from applications running in the IC. For example, ICs may differ from one another in timing characteristics due to manufacturing process variations. Faster ICs can typically meet timing requirements on a lower supply voltage, whereas slower ICs may require higher supply voltage to operate reliably. AVS, as opposed to using the same supply voltage for all ICs at all times, enables reducing power consumption in faster devices, and reverting to higher supply voltages in slower ICs.

AVS techniques can be roughly classified into open-loop AVS and closed-loop AVS. In open-loop AVS the supply voltage is set during production per individual IC, e.g., based on process considerations. In closed-loop AVS the supply voltage is adapted during operation of the IC, and is therefore able to meet temporal variations in demand for power, e.g., as a result of applications running in the IC.

The description above is presented as a general overview of related art in this field and should not be construed as an admission that any of the information it contains constitutes prior art against the present patent application.

SUMMARY

An embodiment that is described herein provides an Integrated Circuit (IC) including electronic circuitry, multiple sensors, and an Adaptive Voltage Scaling (AVS) circuit. The electronic circuitry is configured to be powered by one or more supply voltages. The multiple sensors are configured to measure values affected by the one or more supply voltages, and to produce multiple sensor outputs. The AVS circuit is configured to adaptively set the one or more supply voltages by applying to the sensor outputs an AVS model having one or more user-defined parameters, to generate performance data based on the sensor outputs, to export the performance data from the IC, to receive the one or more user-defined parameters into the IC in response to the performance data, and to configure the AVS model to operate in accordance with the received user-defined parameters.

In some embodiments, the AVS circuit is configured to export the performance data and to receive the user-defined parameters while the IC is operating in a host system, while the host system is undergoing testing. In an embodiment, the IC further includes an AVS configuration interface configured to output the performance data and to receive the user-defined parameters.

In various embodiments, in exporting the performance data, the AVS circuit is configured to export data indicative of one or more of the following: a droop of at least one of the supply voltages in at least one location in the electronic circuitry; and an overshoot in at least one of the supply voltages in at least one location in the electronic circuitry. In various embodiments, in receiving the user-defined parameters, the AVS circuit is configured to receive at least one parameter indicative of one or more of the following: a timing closure voltage under which the electronic circuitry meets specified timing requirements; a voltage offset to be applied to the timing closure voltage; and a droop margin for at least one of the supply voltages.

In a disclosed embodiment, the sensors include multiple Ring Oscillators (RO) associated with respective Voltage Threshold (VT) families used in implementing the electronic circuitry. Additionally, or alternatively, the sensors include multiple Interconnect Ring Oscillators (ITCROs) associated with respective metal layers of the IC, each ITCRO configured to measure capacitances of one or more interconnect structures in a respective metal layer. In an embodiment, the multiple sensors are configured to transfer the sensor outputs via one another, over a serial bus, to the AVS circuit.

There is additionally provided, in accordance with an embodiment that is described herein, a method for Adaptive Voltage Scaling (AVS) in an Integrated Circuit (IC). The method includes powering electronic circuitry of the IC by one or more supply voltages. Values affected by the one or more supply voltages are measured in multiple sensors, to produce multiple sensor outputs. The one or more supply voltages are set adaptively, by applying to the sensor outputs an AVS model having one or more user-defined parameters. Performance data is generated based on the sensor outputs. The performance data is exported from the IC. The one or more user-defined parameters are received into the IC in response to the performance data. The AVS model is configured to operate in accordance with the received user-defined parameters.

There is further provided, in accordance with an embodiment that is described herein, a system including a system controller and an Integrated Circuit (IC). The IC includes electronic circuitry, multiple sensors, and an Adaptive Voltage Scaling (AVS) circuit. The electronic circuitry is configured to be powered by one or more supply voltages. The multiple sensors are configured to measure values affected by the one or more supply voltages, and to produce multiple sensor outputs. The AVS circuit is configured to adaptively set the one or more supply voltages by applying to the sensor outputs an AVS model having one or more user-defined parameters, to generate performance data based on the sensor outputs, to export the performance data to the system controller, to receive the one or more user-defined parameters from the system controller, in response to the performance data, and to configure the AVS model to operate in accordance with the received user-defined parameters.

The present disclosure will be more fully understood from the following detailed description of the embodiments thereof, taken together with the drawings in which:

DETAILED DESCRIPTION OF EMBODIMENTS

Figure 1:
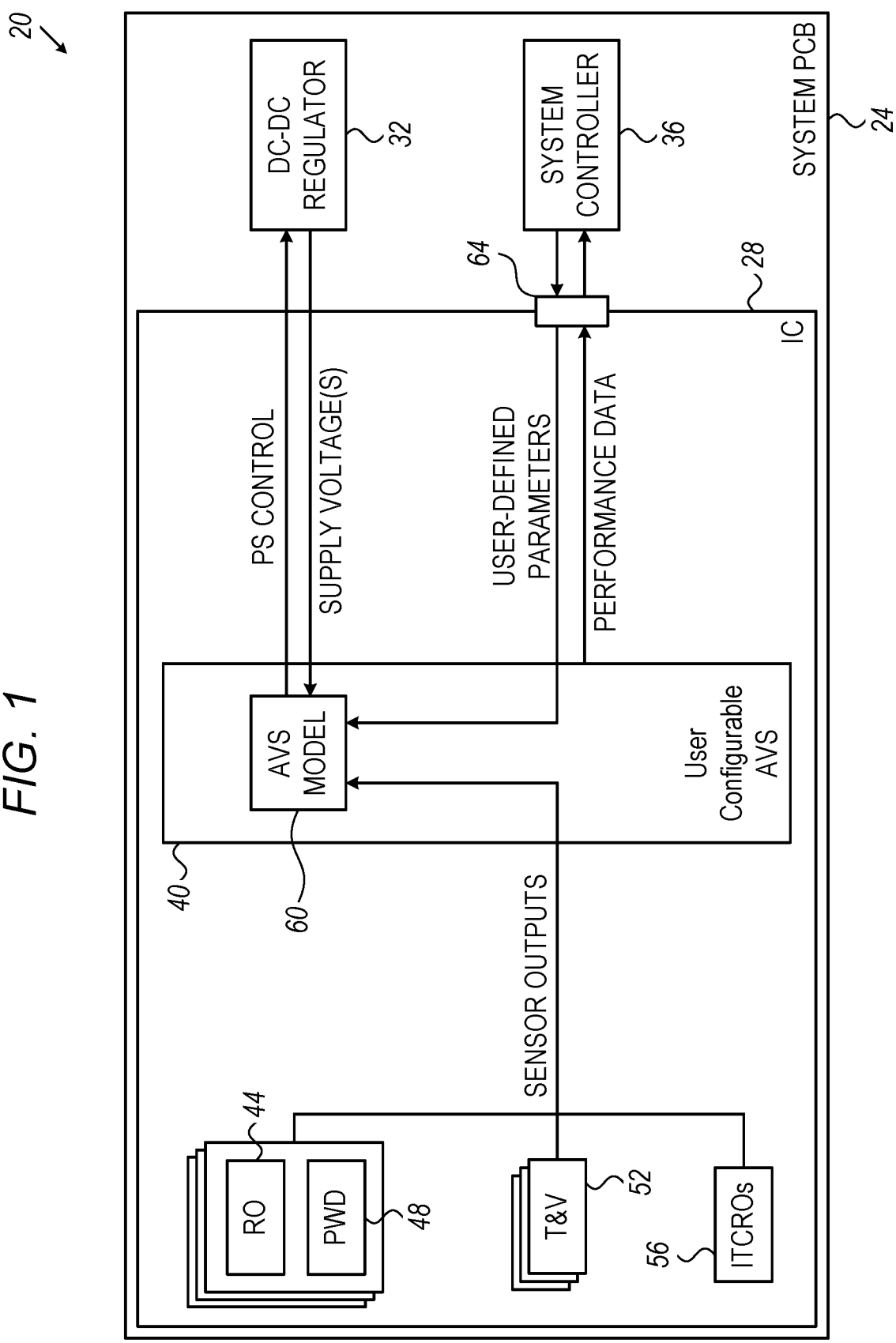
FIG. 1 is a block diagram that schematically illustrates an electronic system comprising an IC that uses user-configurable AVS, in accordance with an embodiment that is described herein.

Embodiments that are described herein provide improved methods and systems for closed-loop AVS. In the disclosed embodiments, an Integrated Circuit (IC) comprises electronic circuitry that is powered by one or more supply voltages. The IC further comprises a plurality of sensors, and an AVS circuit that adapts one or more of the supply voltages based on the sensor outputs. The description that follows will refer to adaptation of a single supply voltage, by way of example. In alternative embodiments, the disclosed techniques can be used for adapting any suitable number of supply voltages.

In various embodiments, the sensors may measure any suitable values affected by the supply voltage. The sensors may comprise, for example, temperature sensors, voltage sensors, Ring Oscillators (ROs) whose outputs are indicative of propagation delays in the IC and therefore of the speed of the IC circuitry, Interconnect Ring Oscillators (ITCROs) whose outputs are indicative of capacitances of interconnect structures in various metal layers of the IC, and others. The sensors are typically distributed across the IC, so as to obtain measurements in different physical areas and in different parts of the electronic circuitry.

In some embodiments, the AVS circuit adapts the supply voltage in a closed loop, by applying an AVS model to the sensor outputs. In the present context, the term "AVS model" refers to any operation that estimates a desired correction to the supply voltage based on the sensor outputs. In some embodiments, the AVS model has one or more parameters that determine how the correction for the supply voltage depend on the sensor outputs. The parameters may comprise, for example, (i) a "timing closure" voltage under which the electronic circuitry is assumed to meet specified timing requirements, (ii) a voltage offset to be applied to the timing closure voltage, or (iii) a "droop margin", defining the permissible droop in the supply voltage resulting from current draw by a load. Additionally, or alternatively, the AVS model may have any other suitable parameters.

In various embodiments, the AVS model may derive the voltage correction by applying any suitable operation to one or more of the parameters. Such operations may comprise, for example, comparing a parameter to a threshold, applying a defined function to a parameter, accessing a look-up table using a parameter, and many others. In one demonstrative example, the AVS model outputs a positive correction (requiring an increase in the supply voltage) if the actual droop measured by any of the voltage sensors exceeds the specified droop margin. If the actual droops measured by the voltage sensors are all smaller than the droop margin by at least a defined amount, the AVS model may output a negative correction (requiring a decrease in the supply voltage).

One possible way of setting the parameters of the AVS model is to characterize the ICs during production testing. In practice, however, this solution is far from optimal because various conditions experienced by the IC (e.g., power-supply characteristics, effects of socket) inevitably differ between production testing and real-life operation.

Thus, in some embodiments described herein, The IC is configured to enable a user to define at least some of the parameters of the AVS model. This configurability enables setting the AVS model parameters while the IC is operating in its intended host system, e.g., while the host system undergoes testing. In this scenario, the term "user" may refer, for example, to an integrator or manufacturer of the host system. Generally, however, the user-defined parameters of the AVS model may be defined by any other suitable entity.

When setting the user-defined parameters during testing of the host system, the AVS model is defined while the IC is subjected to the same conditions (e.g., mounted in the same socket and powered by the same power supply) it will experience during normal operation. The resulting AVS model is therefore more accurate than any AVS model that may be defined during IC production. The disclosed techniques therefore improve AVS performance, e.g., reduce power consumption to the necessary minimum, per IC.

In some embodiments, The IC comprises an AVS configuration interface for exporting performance data and for receiving user-defined parameters for the AVS model in response. The AVS configuration interface may be connected, for example, to a controller of the host system. During testing of the host system, the AVS circuit in the IC receives the outputs of the various sensors, generates performance data based on the sensor outputs, and exports the performance data via the AVS configuration interface. The AVS circuit then receives, in response to the performance data, one or more user-defined parameters for the AVS model. The AVS circuit configures the AVS model to operate in accordance with the received user-defined parameters. This process may be repeated as needed.

FIG. 1 is a block diagram that schematically illustrates an electronic system 20 comprising an IC 28 that uses user-configurable AVS, in accordance with an embodiment that is described herein. In the present example, system 20 comprises IC 28, an adjustable DC-to-DC regulator 32 and a system controller 32, all assembled on a system Printed circuit Board (PCB) 24. Regulator 32 serves as the power supply of IC 28, supplying the IC with one or more supply voltages. As noted above, the description that follows refers to a single supply voltage, solely for simplicity of explanation. This voltage is also referred to as "Vdd" below.

IC 28 comprises electronic circuitry that carries out the designated functionality of the IC. The electronic circuitry is not shown in the figure for the sake of clarity (but is depicted as "system blocks" in FIG. 2 below). In addition to the electronic circuitry, IC 28 comprises a user-configurable AVS circuit 40 and a plurality of sensors. User-configurable AVS circuit is also referred to herein as simply "AVS circuit", for brevity. Each sensor measures a certain value that is affected by the supply voltage Vdd, and outputs a respective sensor output.

In the present example the sensors comprise one or more Ring Oscillators (ROs) 44, one or more Power Watchdogs (PWDs) 48, one or more Temperature and Voltage sensors (T&Vs) 52, and one or more Interconnect Ring Oscillators (ITCROs) 56. In an example embodiment, ROs 44 and PWDs 48 are arranged in pairs, and the pairs are distributed across various blocks of the electronic circuitry of the IC.

A given RO 44 produces an output that is indicative of the dynamic performance (e.g., switching speed, signal propagation speed) of the circuitry in its vicinity. A given RO 44 typically comprises a cascade of inverters connected in a ring, such that the RO oscillation frequency depends on the propagation delays of the inverters. The actual dynamic performance, as measured by RO 44, enables the user to classify the performance of an individual IC 28 vs. a design model (e.g., a SPICE model).

In an embodiment, IC 28 comprises at least a respective RO 44 for each Voltage Threshold (VT) family being used in implementing the electronic circuitry of the IC. ROs 44 are also referred to as "performance ROs" since their performance is indicative of the performance of the various logic paths implemented using the various VT families.

In an embodiment, ROs 44 are "metal loaded", i.e., implemented with a high emphasis on wire loading relative to pin loading, to closely mimic the actual delay characteristics of the circuit logic paths. In one example embodiment, the ratio between metal loading and pin loading is set to 10:1, although any other suitable ratio can be used.

In some embodiments, a given RO 44 may comprise both inverters implemented from NAND gates and inverters implemented from NOR gates. A control signal may configure the RO to use only the NAND-based inverters or only the NOR-based inverters. In this manner, the RO sensor output is indicative of the dynamic performance of various types of logic.

A given PWD 48 produces an output that is indicative of (i) the power-supply noise present in the Vdd supplied to the circuitry in its vicinity, (ii) the actual droop in the Vdd supplied to the circuitry in its vicinity, and/or (iii) the actual overshoot in the Vdd supplied to the circuitry in its vicinity. The term "droop" in this context refers to the decrease in Vdd as a function of the amount of current drawn. The outputs of PWDs 48 enables the user to perform power-supply noise sensitivity analysis, And to specify droop margins correctly per the performance of any individual IC 28.

A given T&V sensor 52 produces an output that is indicative of the temperature in its vicinity, and of the Vdd value supplied to the circuitry in its vicinity. Multiple T&V sensors 52 enable the used to estimate temperature gradients across IC 28, and the effect of these gradients on Vdd.

A given ITCRO 56 produces an output that is indicative of the capacitances of one or more custom hand-routed interconnect structures in a given metal layer of IC 28. In an embodiment, each metal layer of IC 28 comprises a respective ITCRO 56 that can be selectably connected to any of the interconnect structures of that layer. By selecting among different metal structures (e.g., metal loading to the ITCRO) the performance of the ITCRO can be measured as a function of the selected metal. From this measurement, and the modeled SPICE data for this circuit, it is possible to establish a "capacitance ratio" or "metal performance".

The capacitance ratio is defined as the ratio between the capacitance estimates produced by a given ITCRO 56 for two different interconnect structures. The delay or speed performance of the ITCRO depends on Vdd, but this dependence can be canceled out by calculating capacitance ratios instead of capacitances. Consider, for example, two interconnect structures having capacitances C1 and C2, which can be connected alternately to a given ITCRO 56. In an example embodiment, AVS circuit 40 estimates the capacitance ratio C1/C2 by calculating the ratio Delta_period1/Delta_period2, wherein Delta_period1 is defined as Period_structure1-Period_empty_ref_load, and Delta_period2=Period_structure2-Period_empty_ref_load. Period_empty_ref_load denotes the measured oscillation period of the ITCRO when operating in an unloaded reference configuration (i.e., when not connected to any of the test interconnect structures.)

The use of capacitance ratios is considered one non-limiting example of a technique for estimating the capacitances of interconnect structures using ITCROs 56. In alternative embodiments, AVS circuit 40 may estimate the capacitances of the various interconnect structures using ITCROs 56 in any other suitable way. In a typical embodiment, although not necessarily, the output of a given ITCRO is measured rarely, e.g., during production testing and/or on power-on of IC 28.

In an example implementation, IC 28 comprises on the order of twenty-five to forty ROs 44, twenty-five to forty PWDs 48, ten to fifteen T&V sensors 52, and four ITCROs 56. ROs 44 and PWDs 48 are typically scattered across the IC. ITCROs 56 are typically located at the four corners of the IC. Alternatively, any other suitable numbers and distributions of sensors can be used. In other embodiments, any other suitable type of sensor whose measurements are affected by Vdd can be used.

The outputs of the various sensors are provided to AVS circuit 40. AVS circuit 40 applies an AVS model 60 to the sensor outputs. AVS model 60 produces a requested correction to the supply voltage based on the sensor outputs. The correction is applied by sending a Power Supply (PS) control signal to DC-DC regulator 32, which adjusts Vdd accordingly. The interface between IC 28 and regulator 32, which carries the PS control signal, may comprise, for example, an I2C bus, SMBus, PMBus, or any other suitable interface.

In some embodiments, AVS model 60 is specified in terms of one or more user-defined parameters. In the example of FIG. 1, IC 28 comprises an AVS configuration interface 64, which is used for (i) exporting performance data from AVS circuit 40 to system controller 36, and (ii) receiving one or more user-defined parameters from system controller 36, for use in AVS model 60. AVS configuration interface 64 may comprise, for example, pins or other terminals of IC 28. In other embodiments, IC 28 and system controller 36 communicate with one another over a suitable bus, for various purposes, and the functionality of AVS configuration interface 64 is implemented using this bus.

In an embodiment, AVS circuit 40 derives performance data from the outputs of the various sensors (e.g., ROs 44, PWDs 48, T&V sensors 52 and ITCROs 56) and sends the performance data to system controller 36 via AVS configuration interface 64. In response, system controller 36 sends one or more user-defined parameters over interface 64. AVS circuit 40 substitutes the received user-defined parameters in AVS model 60.

Several non-limiting examples of performance data, which is derived by AVS circuit 40 and exported to system controller 36, include the following:

Effective supply-voltage droop.

Effective supply-voltage overshoot.

Classified silicon performance (e.g., dynamic performance) vs. design goal (e.g., SPICE model).

Any of the performance data may be available for multiple locations in IC 28, e.g., derived from outputs of various sensors. In various embodiments, AVS circuit 40 may export the worst-case performance, or the complete set of performance data. The complete set of performance data enables the user to generate gradient data for the various performance measures (gradients the performance data across IC 28).

The exported performance data enables the user to optimize the operation of IC 28 under the actual conditions present in system 20. For example, the user may control the IC activity (e.g., load step size) to reduce voltage droop. In this manner, the user can reduce the average Vdd, which in turn reduces power consumption.

Several non-limiting examples of user-defined parameters, received from system controller 36 in response to the performance data, include the following:

Timing closure voltage for IC 28, as defined above.

Droop margin, as defined above.

One or more performance tuning parameters, e.g., performance scaling factor, voltage offset to be applied to the timing closure voltage, etc. Such tuning parameters enable the user to implement any desired trade-off between power and robustness.

The performance data and user-defined parameters listed above are non-limiting examples chosen solely for the sake of conceptual clarity. In alternative embodiments, any other suitable types of performance data and/or user-defined parameters can be used.

In various embodiments, the user (e.g., integrator or manufacturer of system 20) may use any suitable technique for tuning the AVS model (i.e., for specifying the user-defined parameters of AVS model 60) based on the performance data exported from IC 28. In one example, system controller 36 receives a set of voltage droop values as measured by various PWDs 48, or it may receive only the largest (worst-case) droop value. System controller 36 may then specify the droop margin for IC 28 based on the worst-case droop value. The specified droop margin (example of a user-defined parameter of the AVS model) may be specified to be equal to the worst-case droop value, or a slightly larger value to allow some extra margin.

Figure 2:
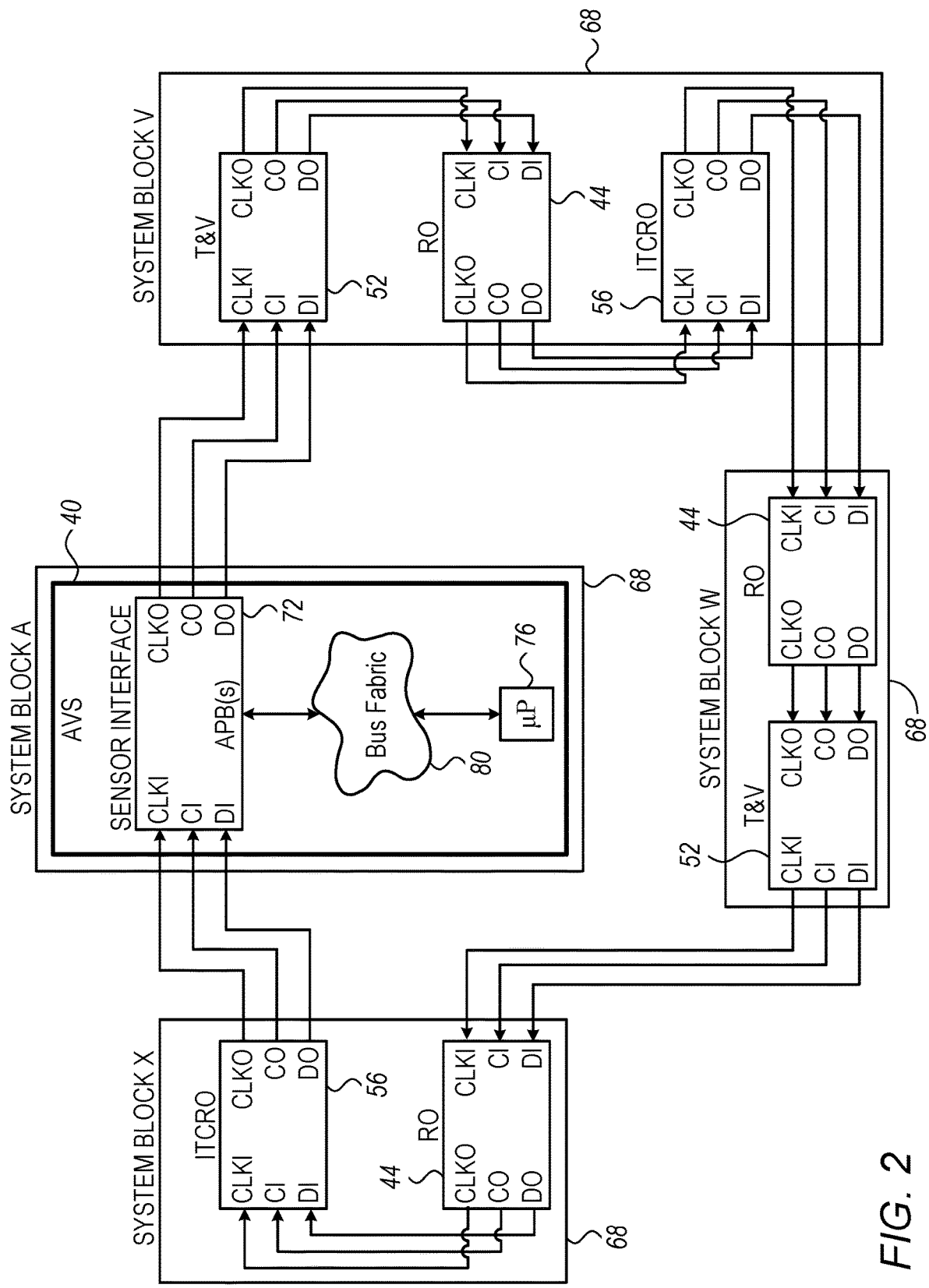
FIG. 2 is a block diagram that schematically illustrates an interconnection scheme for communicating sensor outputs to an AVS circuit in the IC of FIG. 1, in accordance with an embodiment that is described herein.

FIG. 2 is a block diagram that schematically illustrates an interconnection scheme for communicating sensor outputs to AVS circuit 40 in IC 28, in accordance with an embodiment that is described herein. In the present example, the electronic circuitry of IC 28 comprises four system blocks 68, denoted "A", "V", "W" and "X". At least some of system blocks 68 have sensors coupled thereto: Block "V" has a T&V sensor 52, an RO 44 and an ITCRO 56; block "W" has T&V sensor 52 and an RO 44; and block "X" has an RO 44 and an ITCRO 56. AVS circuit 40 is coupled to block "A".

In some embodiments, the sensors and AVS circuit 40 are connected in a ring using a six-wire serial bus. Each sensor (and also AVS circuit 40) comprises three inputs (source-synchronous Clock Input (CLKI), Data Input (DI) and Control Input (CI)) and three outputs (inverted source-synchronous Clock Output (CLKO), Data Output (DO) and Control Output (CO)). Each sensor (and also AVS circuit 40) clocks the next sensor (or AVS circuit 40) along the ring. To transfer a sensor output from a certain sensor to AVS circuit 40, the sensor sends the data to the next sensor along the ring. Each sensor relays data to the next sensor until reaching the AVS circuit.

In an embodiment, AVS circuit 40 is also connected to a microprocessor 76 via a system-bus fabric 80, e.g., for firmware loading, parameter configuration, AVS system initialization, AVS management, interlocking with the host system via a suitable Application Programming Interface (API), and the like. One non-limiting example of an API with the host system is the System Control and Management Interface (SCMI).

The configurations of system 20 and of IC 28, as shown in FIGS. 1 and 2, are example configurations that are depicted solely for the sake of clarity. In alternative embodiments, any other suitable configurations can be used.

The various elements of system 20 and of IC 28 may be implemented using dedicated hardware or firmware, such as using hard-wired or programmable logic, e.g., in an Application-Specific Integrated Circuit (ASIC) or Field-Programmable Gate Array (FPGA). Additionally, or alternatively, some functions of system 20 and of IC 28 may be implemented in software and/or using a combination of hardware and software elements. Elements that are not mandatory for understanding of the disclosed techniques have been omitted from the figure for the sake of clarity.

In some embodiments, some or all functions of AVS circuit 40 and/or of system controller 36 may be implemented in one or more programmable processors, e.g., one or more Central Processing Units (CPUs) or microcontrollers, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 3:
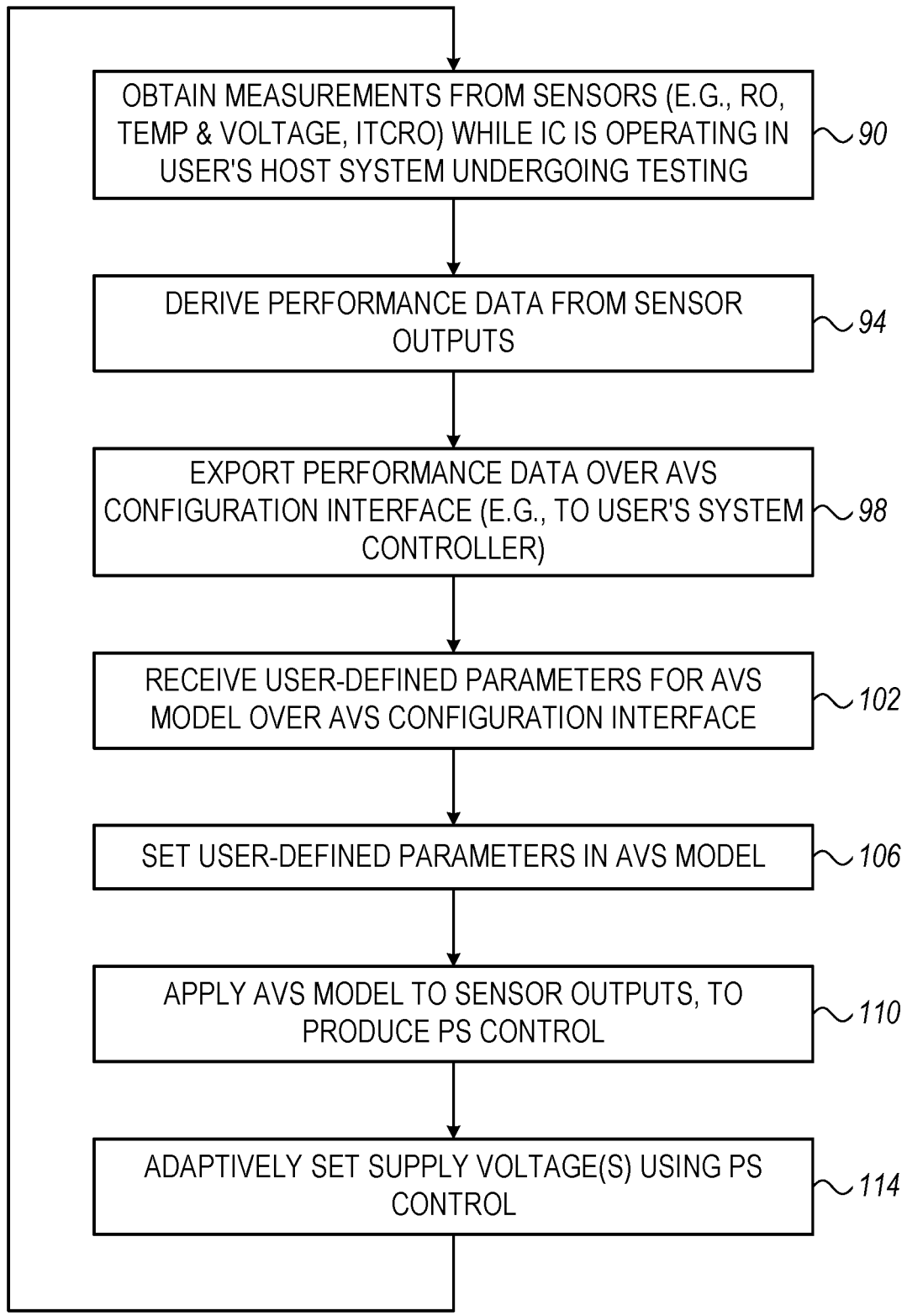
FIG. 3 is a flow chart that schematically illustrates a method for user-configurable AVS, in accordance with an embodiment that is described herein.

FIG. 3 is a flow chart that schematically illustrates a method for user-configurable AVS, in accordance with an embodiment that is described herein. The method begins with AVS circuit 40 obtaining measurements from the various sensors in IC 28 (e.g., from ROs 44, PWDs 48, T&V sensors 52 and/or ITCROs 56, at a measurement input stage 90.

At a performance derivation stage 94, AVS circuit 40 derives performance data from the sensor outputs. At an exporting stage 98, AVS circuit 40 exports the performance data to system controller 36 over AVS configuration interface 64. At a parameter reception stage 102, AVS circuit 40 receives one or more user-defined parameters for AVS model 60 over interface 64. At a model setting stage 106, AVS circuit 40 substitutes the user-defined parameters in AVS model 60.

At a model application stage 110, AVS circuit 40 applies AVS model 60 to the sensor outputs. The output of model 60 comprises a requested correction to the supply voltage Vdd. At a voltage setting stage 114, AVS circuit 40 controls DC-DC regulator 32 to apply the correction using the "PS control" signal. The method then loops back to stage 90 above, and the process continues in a closed-loop manner.

In some embodiments, the various sensors (e.g., ROs 44, PWDs 48, T&V sensors 52 and ITCROs 56) can also be used for detecting faults in the power-supply circuitry of system 20. Example faults may include broken bypass capacitors or a faulty DC-DC converter. The sensors can also provide an early warning regarding imminent faults. Further additionally, the sensors can provide alerts indicative of side-channel attacks, e.g., temperature attacks, clock manipulation attacks and voltage manipulation attacks.

Additionally, or alternatively, the methods and systems described herein can also be used in other applications, such as in Dynamic Voltage and Frequency Scaling (DVFS), software/application/hardware/device-operation operational characterization (e.g., load-step mitigation and management), and hardware operational margin analysis and characterization.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Integrated Circuit (IC), comprising:
electronic circuitry, configured to be powered by one or more supply voltages;
multiple sensors, configured to measure values affected by the one or more supply voltages, and to produce multiple sensor outputs; and
an Adaptive Voltage Scaling (AVS) circuit, configured to:
adaptively set the one or more supply voltages, by applying to the sensor outputs an AVS model having one or more user-defined parameters;
generate performance data based on the sensor outputs;
export the performance data from the IC over a configuration interface to a controller operable by a user;
receive from the controller over the configuration interface the one or more user-defined parameters into the IC, the one or more user-defined parameters having been input by a user to the controller in response to the export of the performance data; and
configure the AVS model to operate in accordance with the received user-defined parameters.

2. The IC according to claim 1, wherein the AVS circuit is configured to export the performance data and to receive the user-defined parameters while the IC is operating in a host system, while the host system is undergoing testing.

3. The IC according to claim 1, wherein, in exporting the performance data, the AVS circuit is configured to export data indicative of one or more of the following:
a droop of at least one of the supply voltages in at least one location in the electronic circuitry; and
an overshoot in at least one of the supply voltages in at least one location in the electronic circuitry.

4. The IC according to claim 1, wherein, in receiving the user-defined parameters, the AVS circuit is configured to receive at least one parameter indicative of one or more of the following:
a timing closure voltage under which the electronic circuitry meets specified timing requirements;
a voltage offset to be applied to the timing closure voltage; and
a droop margin for at least one of the supply voltages.

5. The IC according to claim 1, wherein the sensors comprise multiple Ring Oscillators (RO) associated with respective Voltage Threshold (VT) families used in implementing the electronic circuitry.

6. The IC according to claim 1, wherein the sensors comprise multiple Interconnect Ring Oscillators (ITCROs) associated with respective metal layers of the IC, each ITCRO configured to measure capacitances of one or more interconnect structures in a respective metal layer.

7. The IC according to claim 1, wherein the multiple sensors are configured to transfer the sensor outputs via one another, over a serial bus, to the AVS circuit.

8. The IC according to claim 1, wherein the AVS circuit is configured to configure the AVS model during operation of the IC to operate in accordance with the received user-defined parameters.

9. The IC according to claim 1, wherein the configuration interface is implemented using a terminal of the IC or a communication bus.

10. The IC according to claim 1, wherein the AVS circuit is configured to receive from the controller a user-defined parameter that specifies a droop margin input by the user to the controller, and to tune the AVS model using the specified droop margin.

11. The IC according to claim 1, wherein the AVS circuit is configured to configure the AVS model by substituting one or more parameters of the AVS model with the received one or more user-defined parameters.

12. A method for Adaptive Voltage Scaling (AVS) in an Integrated Circuit (IC), the method comprising:
powering electronic circuitry of the IC by one or more supply voltages;
measuring values affected by the one or more supply voltages in multiple sensors, to produce multiple sensor outputs;
adaptively setting the one or more supply voltages, by applying to the sensor outputs an AVS model having one or more user-defined parameters;
generating performance data based on the sensor outputs;
exporting the performance data from the IC over a configuration interface to a controller operable by a user;
receiving from the controller over the configuration interface the one or more user-defined parameters into the IC, the one or more user-defined parameters having been input by a user to the controller in response to the export of the performance data; and
configuring the AVS model to operate in accordance with the received user-defined parameters.

13. The method according to claim 12, wherein exporting the performance data and receiving the user-defined parameters are performed while the IC is operating in a host system, while the host system is undergoing testing.

14. The method according to claim 12, wherein exporting the performance data comprises exporting data indicative of one or more of the following:
a droop of at least one of the supply voltages in at least one location in the electronic circuitry; and
an overshoot in at least one of the supply voltages in at least one location in the electronic circuitry.

15. The method according to claim 12, wherein receiving the user-defined parameters comprises receiving at least one parameter indicative of one or more of the following:
a timing closure voltage under which the electronic circuitry meets specified timing requirements;
a voltage offset to be applied to the timing closure voltage; and
a droop margin for at least one of the supply voltages.

16. The method according to claim 12, wherein measuring the values comprises applying multiple Ring Oscillators (RO) associated with respective Voltage Threshold (VT) families used in implementing the electronic circuitry.

17. The method according to claim 12, wherein measuring the values comprises applying multiple Interconnect Ring Oscillators (ITCROs) associated with respective metal layers of the IC, including applying each ITCRO to measure capacitances of one or more interconnect structures in a respective metal layer.

18. The method according to claim 12, wherein measuring the values comprises transferring the sensor outputs from the sensors, via one another, over a serial bus, to an AVS circuit.

19. A system, comprising:
a system controller; and
an Integrated Circuit (IC), comprising:
electronic circuitry, configured to be powered by one or more supply voltages;
multiple sensors, configured to measure values affected by the one or more supply voltages, and to produce multiple sensor outputs; and an Adaptive Voltage Scaling (AVS) circuit, configured to:
adaptively set the one or more supply voltages, by applying to the sensor outputs an AVS model having one or more user-defined parameters;
generate performance data based on the sensor outputs;
export the performance data over a configuration interface to the system controller, the system controller operable by a user;
receive from the system controller over the configuration interface the one or more user-defined parameters into the IC, the one or more user-defined parameters having been input by a user to the system controller in response to the export of the performance data; and
configure the AVS model to operate in accordance with the received user-defined parameters.

20. The system according to claim 19, wherein the AVS circuit is configured to export the performance data and to receive the user-defined parameters while the system is undergoing testing.

\* \* \* \* \*